United States Patent
Miyoshi et al.

(10) Patent No.: US 10,988,064 B2
(45) Date of Patent: Apr. 27, 2021

(54) EPIDERMIS MATERIAL FOR VEHICLE SEAT

(71) Applicant: TS TECH CO., LTD., Asaka (JP)

(72) Inventors: Takako Miyoshi, Tochigi (JP); Junichi Takahashi, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 270 days.

(21) Appl. No.: 15/517,070

(22) PCT Filed: Oct. 5, 2015

(86) PCT No.: PCT/JP2015/078200
§ 371 (c)(1),
(2) Date: Apr. 5, 2017

(87) PCT Pub. No.: WO2016/056508
PCT Pub. Date: Apr. 14, 2016

(65) Prior Publication Data
US 2017/0305314 A1   Oct. 26, 2017

(30) Foreign Application Priority Data
Oct. 6, 2014   (JP) .............................. JP2014-205623

(51) Int. Cl.
*B60N 2/58* (2006.01)
*B32B 9/02* (2006.01)
(Continued)

(52) U.S. Cl.
CPC .................. *B60N 2/58* (2013.01); *B32B 3/12* (2013.01); *B32B 3/30* (2013.01); *B32B 5/024* (2013.01);
(Continued)

(58) Field of Classification Search
CPC . Y10S 428/904; Y10T 428/4935; B32B 9/02; B32B 9/025; B32B 5/02;
(Continued)

(56) References Cited

U.S. PATENT DOCUMENTS 1,516,571 A * 11/1924 Moore ...................... C14B 7/04
156/254
3,031,873 A * 5/1962 Brett, Jr. .................. A43D 8/34
69/13

(Continued)

FOREIGN PATENT DOCUMENTS

CN          2377276 Y      5/2000
JP          03-035800 U1   4/1991
(Continued)

OTHER PUBLICATIONS

Mesh definition, Textile Glossary, Celanese Acetate, copyright 2001 (Year: 2001).*

(Continued)

*Primary Examiner* — Jennifer A Steele
(74) *Attorney, Agent, or Firm* — Faegre Drinker Biddle & Reath LLP

(57) ABSTRACT

A cover material for a vehicle seat provides favorable touch while utilizing the texture of a leather material. A cover material for a vehicle seat includes: a leather portion made of natural leather or artificial leather; and a mesh fabric portion bonded to the back side of the leather portion.

9 Claims, 4 Drawing Sheets

(51) Int. Cl.
| | |
|---|---|
| *D06N 3/00* | (2006.01) |
| *B32B 5/02* | (2006.01) |
| *B32B 9/04* | (2006.01) |
| *B32B 5/26* | (2006.01) |
| *B32B 7/12* | (2006.01) |
| *D04B 1/10* | (2006.01) |
| *B68F 1/00* | (2006.01) |
| *C14B 1/02* | (2006.01) |
| *C14B 1/14* | (2006.01) |
| *B32B 7/02* | (2019.01) |
| *B32B 3/30* | (2006.01) |
| *B32B 7/04* | (2019.01) |
| *B32B 3/12* | (2006.01) |
| *D03D 11/00* | (2006.01) |

(52) U.S. Cl.
CPC .............. *B32B 5/026* (2013.01); *B32B 5/028* (2013.01); *B32B 5/26* (2013.01); *B32B 7/02* (2013.01); *B32B 7/04* (2013.01); *B32B 7/12* (2013.01); *B32B 9/02* (2013.01); *B32B 9/025* (2013.01); *B32B 9/04* (2013.01); *B32B 9/047* (2013.01); *B68F 1/00* (2013.01); *C14B 1/02* (2013.01); *C14B 1/14* (2013.01); *D03D 11/00* (2013.01); *D04B 1/102* (2013.01); *D06N 3/00* (2013.01); *B32B 2250/03* (2013.01); *B32B 2250/04* (2013.01); *B32B 2250/05* (2013.01); *B32B 2262/0276* (2013.01); *B32B 2307/50* (2013.01); *B32B 2307/51* (2013.01); *B32B 2307/554* (2013.01); *B32B 2307/718* (2013.01); *B32B 2307/732* (2013.01); *B32B 2605/003* (2013.01); *D10B 2403/0112* (2013.01); *D10B 2505/08* (2013.01)

(58) Field of Classification Search
CPC ......... B32B 5/022; B32B 5/024; B32B 5/026; B32B 5/028; B32B 5/04; B32B 5/06; B32B 5/08; B32B 5/10; B32B 5/12; B32B 5/14; B32B 5/142; B32B 5/145; B32B 5/147; B32B 5/24; B32B 5/245; B32B 5/26; B32B 5/28; B32B 7/12; B32B 7/14; B32B 37/0084; D04B 1/102; D03D 11/00; D10B 2403/0112; D10B 2505/08; C14B 1/02; C14B 1/14; B60N 2/58; B68F 1/00; D06N 3/00; A47C 31/006; A47C 31/00
See application file for complete search history.

(56) References Cited

U.S. PATENT DOCUMENTS

| | | | | |
|---|---|---|---|---|
| 4,465,730 | A | * | 8/1984 | Okada ...................... B32B 5/26 442/243 |
| 4,530,873 | A | * | 7/1985 | Okada .................... A41D 31/02 442/79 |
| 6,231,940 | B1 | * | 5/2001 | Aichner .................... B32B 9/00 428/332 |
| 2002/0034901 | A1 | | 3/2002 | Fujita et al. |
| 2012/0184167 | A1 | * | 7/2012 | Watkinson ................ B32B 5/26 442/189 |

FOREIGN PATENT DOCUMENTS

| | | | |
|---|---|---|---|
| JP | 06-016959 Y2 | 5/1994 | |
| JP | 09-039190 A | 2/1997 | |
| JP | 2002-054059 | * 2/2002 | ............ D04B 21/14 |
| JP | 2002-054059 A | 2/2002 | |
| JP | 2013-203169 A | 10/2013 | |

OTHER PUBLICATIONS

Office Action issued in related application CN 201580051193.6, dated Aug. 2, 2018, with machine generated English language translation, 8 pages.

Office Action issued in related application JP 2014-205623, dated Apr. 10, 2018, with machine generated English language translation, 6 pages.

\* cited by examiner

EPIDERMIS MATERIAL FOR VEHICLE SEAT

CROSS REFERENCE TO RELATED APPLICATIONS

This application is National Stage Entry application of PCT Application No. PCT/JP2015/078200, filed Oct. 5, 2015, which claims the priority benefit of Japanese Patent Application No. JP2014-205623, filed Oct. 6, 2014, the contents being incorporated herein by reference.

BACKGROUND

The present disclosure relates to a cover material for a vehicle seat and particularly relates to a cover material for a vehicle seat to which a leather material is applied.

Natural leather or artificial leather is known as an example of a cover material for a vehicle seat. These leather materials are used as the cover material, thereby enhancing the quality (e.g., luxurious feel) of the vehicle seat. A cover material configured in such a way that natural leather or artificial leather is bonded to another material has been developed. As an example of such a cover material, Japanese Patent Document JP H09-039190A describes a cover material configured in such a way that natural leather from which a split layer is removed is bonded to a sheeted elastic base member.

A cover material for a vehicle seat to which natural leather or artificial leather is applied is desired to utilize the texture of the leather material and provide favorable touch (for example, a tactile sense an occupant has when seated on the vehicle seat and touching the cover material). However, it may be difficult for the cover material to provide favorable touch depending on the type or structure of a material bonded to the leather material. For example, if a material has a flat surface as the sheeted elastic base member as described in Japanese Patent Document JP H09-039190A, the flat surface of the material is bonded by surface contact to a leather material; therefore, it may be difficult for the cover material to provide favorable touch.

SUMMARY

Thus, the present disclosure is made in view of the above problem. An embodiment of the present disclosure provides a cover material for a vehicle seat to which a leather material is applied and which utilizes the texture of the leather material and provides favorable touch.

The foregoing problem is solved by various embodiments of a cover material for a vehicle seat according to the present disclosure. In an embodiment, the cover material includes: a leather portion made of natural leather or artificial leather; and a mesh fabric portion located on a back side of the leather portion. According to the aforementioned configuration, the mesh fabric portion is arranged on the back side of the leather portion, therefore being bonded not by surface contact but by point or line contact to the leather portion. Accordingly, the touch of the cover material is improved compared with the configuration in which the fabric portion is bonded by surface contact to the leather portion. Therefore, the cover material for the vehicle seat of the present disclosure can utilize the texture of the leather portion and provide favorable touch.

Further, in an embodiment of the cover material for the vehicle seat, a degree of unevenness of one of upper and back surfaces in the fabric portion is greater than the degree of unevenness of the other of the upper and back surfaces. According to the aforementioned configuration, the degree of unevenness of one of the upper and back surfaces in the fabric portion is greater than the degree of unevenness of the other of the upper and back surfaces. Therefore, the volume of the fabric portion is enhanced compared with the configuration in which the degree of unevenness of the upper surface is uniform with the degree of unevenness of the back surface. Consequently, the physical property (particularly, the volume) of the entire cover material can be enhanced.

Furthermore, in an embodiment of the cover material for the vehicle seat, a plurality of layers is arranged in a laminated state in the fabric portion, the layers being knitted or woven in a different manner to have different mesh sizes from each other. According to the aforementioned configuration, the mesh fabric portion is formed of the plurality of layers arranged in the laminated state. Also, one of the plurality of layers, which has a relatively larger mesh size is lighter (specifically, lower in density) than a layer having a relatively smaller mesh size. Therefore, the weight of the cover material including the layer having the larger mesh size in the fabric portion is further reduced compared with a cover material uniformly having the smaller mesh size. The layer having the smaller mesh size in the plurality of layers is densely structured and has high strength (high rigidity) compared with the layer having the larger mesh size. Therefore, the strength of the cover material including the layer having the smaller mesh size in the fabric portion is higher than the strength of a cover material uniformly having the larger mesh size. As described above, the layers having the physical properties different from each other are provided in the laminated state in the fabric portion; thereby, the texture of the leather portion is utilized, and in the meantime, the weight reduction and strength enhancement of the entire cover material can be achieved.

Moreover, in an embodiment of the cover material for the vehicle seat, the fabric portion is bonded to a back surface of the leather portion via one of the plurality of layers, which has a smaller mesh size. In particular, the fabric portion includes a back-side layer and an upper-side layer, the back-side layer having the smaller mesh size, the upper-side layer having a larger mesh size, and the fabric portion may be bonded to the back surface of the leather portion with adhesive applied to a surface of the back-side layer, the surface being located opposite of the upper-side layer. In the aforementioned configuration, the fabric portion is bonded to the back surface of the leather portion via the layer of the plurality of layers, having the smaller mesh size. Therefore, compared with a case of bonding via the layer having the larger mesh size, a bonding area is increased and thus the fabric portion and the leather portion can be further firmly bonded together.

Also, in an embodiment of the cover material for the vehicle seat, the fabric portion is formed by a plain knitted lining, and one of the plurality of layers which has the larger mesh size is formed of drop stitches. In the aforementioned configuration, the fabric portion is formed by the plain knitted lining, and the layer of the plurality of layers, having the larger mesh size, is formed of drop stitches. In other words, drop stitches are formed in the course of knitting the lining; thereby, the layer having the larger mesh size can be more easily formed.

Further, in an embodiment of the cover material for the vehicle seat, an elasticity of the fabric portion is higher than an elasticity of the leather portion. In the aforementioned configuration, the fabric portion having the elasticity higher than that of the leather portion is provided. Therefore, the cover material has a higher elasticity compared with a cover material formed only by a leather portion. As a result, when an occupant is seated on the vehicle seat and portions of the seat are therefore deformed, the cover material is appropriately deformed according to the deformation of the portions of the seat.

Furthermore, in an embodiment of the cover material for the vehicle seat, a weight per unit area of the fabric portion is equal to or larger than a reference value of 100 g/m$^2$. In the aforementioned configuration, the fabric portion is configured such that the weight per unit area (the so-called basis weight) is equal to or larger than 100 g/m$^2$. This is because if the basis weight is below the foregoing reference value, the strength provided by the fabric portion to the cover material has difficulty reaching a strength suitable for the usage of a cover material for a vehicle seat. In other words, according to the aforementioned configuration, the strength required for a cover material for a vehicle seat is more easily obtained.

Moreover, in an embodiment of the cover material for the vehicle seat, the leather portion is made of natural leather or artificial leather processed to have a thickness smaller than that before the leather is processed. In the aforementioned configuration, the leather portion made of natural leather or artificial leather is processed to have the thickness smaller than that before the leather is processed, and the mesh fabric portion is arranged on the back side of the leather portion. Accordingly, the thickness of the leather portion is reduced and thereby the weight reduction of the entire cover material is achieved, and in the meantime, the volume of the entire cover material can be maintained and the strength thereof can be maintained.

Also, in an embodiment of the cover material for the vehicle seat, the leather portion is made of natural leather split to have a thickness equal to or smaller than half of that before the leather has been split. According to the aforementioned configuration, the leather portion is processed to be thinner (preferably as much as possible); thereby, the weight reduction of the entire cover material can be achieved. Also, if the leather portion is made of natural leather, the configuration where the fabric portion is bonded to the leather portion to secure the physical property of the cover material may provide a more significant effect. Specifically, the physical property (for example, strength or the like) of natural leather varies depending on an area of a living organism from which the leather is extracted. Therefore, if the cover material is made only of natural leather, the physical property of the entire cover material may vary due to a difference between extraction sites of the natural leather. On the other hand, if the cover material is configured in such a way that natural leather is processed to be thinner and then the fabric portion is bonded to the leather, an influence due to a difference between extraction sites of the leather is minimized. As a result, the physical property of the cover material can be made to be more uniform.

According to an embodiment of the present disclosure, favorable touch can be provided while utilizing the texture of a leather portion. Also, according to an embodiment of the present disclosure, the degree of unevenness of one of the upper and back surfaces in the fabric portion is greater than the degree of unevenness of the other of the upper and back surfaces. Therefore, the volume can be enhanced compared with a cover material configured such that upper and back surfaces are uniform in the degree of unevenness. Further, according to an embodiment of the present disclosure, the layers having the physical properties different from each other are provided in the laminated state in the fabric portion; thereby, the texture of the leather portion is utilized, and also a weight reduction and strength enhancement of the entire cover material can be achieved. Furthermore, according to an embodiment of the present disclosure, the fabric portion is bonded to the back surface of the leather portion via a layer of the plurality of layers, having a smaller mesh size. Therefore, a bonding area is increased and thus the fabric portion and the leather portion can be further firmly bonded together. Moreover, according to an embodiment of the present disclosure, drop stitches are formed in the course of plain-knitting the lining that forms the fabric portion; thereby, the mesh size of the layer can be further increased. Also, according to an embodiment of the present disclosure, the fabric portion having an elasticity higher than that of the leather portion is provided. Therefore, the cover material that is higher in elasticity than leather is obtained. Accordingly, when an occupant is seated on the vehicle seat and portions of the seat are therefore deformed, the cover material is appropriately deformed according to the deformation of the portions of the seat.

Further, according to an embodiment of the present disclosure, the fabric portion is configured such that the weight per unit area (the so-called basis weight) is equal to or larger than 100 g/m$^2$. Therefore, a strength suitable for a cover material for a vehicle seat can be more easily obtained. Furthermore, according to an embodiment of the present disclosure, the leather portion made of natural leather or artificial leather is processed to have a thickness smaller than that before the leather is processed, and the mesh fabric portion is arranged on the back side of the leather portion. Therefore, the weight reduction of the entire cover material is achieved, the volume of the entire cover material can be maintained, and the strength thereof can be maintained. Moreover, according to an embodiment of the present disclosure, the leather portion is processed to be thinner (preferably as thin as possible); thereby, the weight reduction of the entire cover material is achieved, and in addition, the physical property of the entire cover material can be inhibited from varying due to a difference between extraction sites of natural leather.

DETAILED DESCRIPTION

An embodiment of the present disclosure (the present embodiment) is hereinafter described. The embodiment is described below for facilitating understanding of the invention and does not restrict the invention. In other words, the embodiments may be modified or changed without departing from the scope of the invention, and it will be understood that the invention may include its equivalents.

Figure 1:
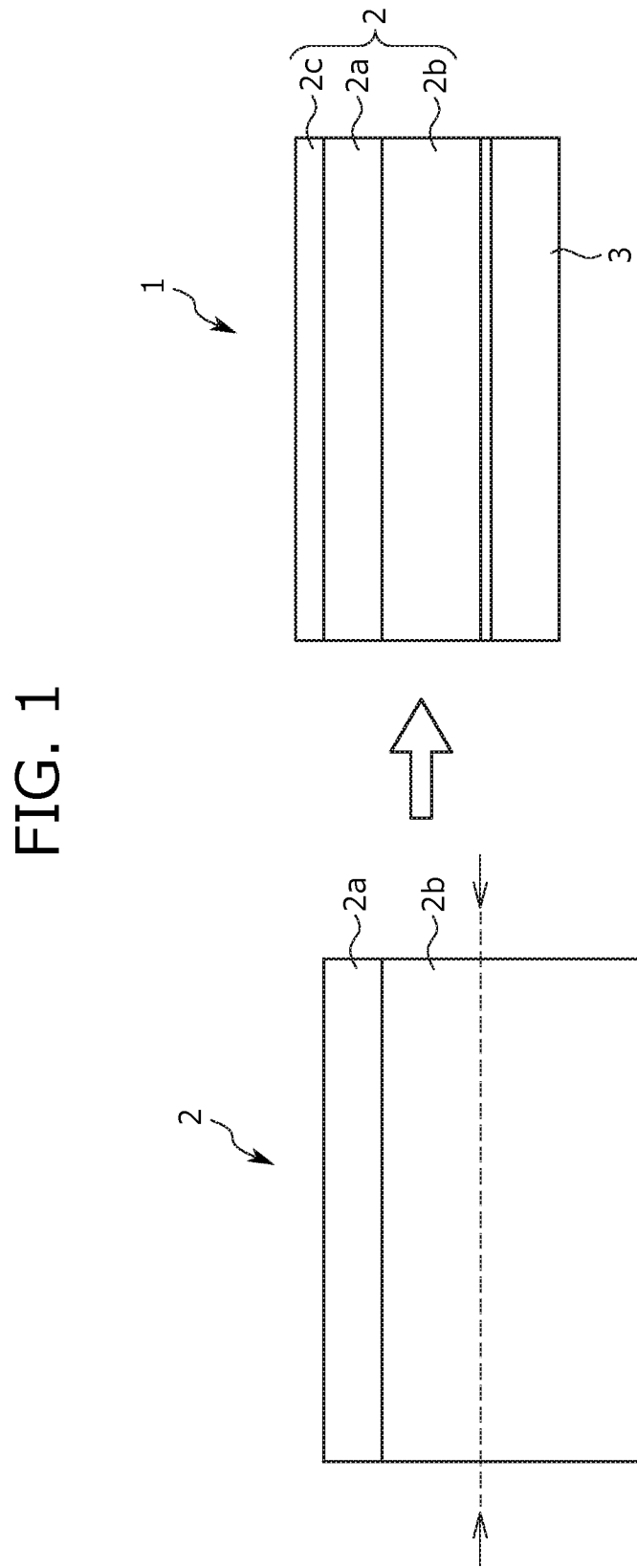
FIG. 1 is an explanatory diagram of a cover material for a vehicle seat according to an embodiment of the present disclosure.

As shown in FIG. 1, a cover material for a vehicle seat (which is referred to as "cover material 1") according to the present embodiment is configured in such a way that a leather portion 2 and a fabric portion 3 are bonded together with an adhesive. FIG. 1 is an explanatory diagram of the cover material 1 and is a view schematically illustrating a cross-section of the cover material 1. For simple illustration purposes, in FIG. 1, a thickness ratio between respective portions (for example, a thickness ratio between the leather portion 2 and the fabric portion 3) of the cover material 1 is different from an actual value.

The cover material 1 is made of two materials, and specifically, it includes only the leather portion 2 and the fabric portion 3, but is not limited thereto. For example, another member (for example, a sheet body such as a double-faced tape) may be interposed between the leather portion 2 and the fabric portion 3.

The leather portion 2 forms an exterior surface (design surface) of the vehicle seat. In the present embodiment, the leather portion 2 is configured in such a way that natural leather is split to have a thickness smaller than that before the leather is split. More specifically, the leather portion 2 is configured in such a way that natural leather is split to have a thickness equal to or smaller than half of that before the leather is split. The leather portion 2 includes a grain layer 2a and a split layer 2b. In addition, surface treatment for enhancing wear resistance is applied to the surface (the so-called grain) of the grain layer 2a, thereby forming a surface treated layer 2c.

An example of the natural leather forming the leather portion 2 includes animal leather such as bull leather, horse leather, or swine leather, but is not limited thereto, and any biological leather may be applied. Also, natural leather may be extracted from any leather extraction site of a living organism. Furthermore, the leather portion 2 is made of natural leather in the present embodiment. Alternatively, the leather portion 2 may be made of artificial leather.

The fabric portion 3 is arranged on the back side of the leather portion 2 in the cover material 1. The fabric portion 3 is technically bonded to the back surface of the cover material 1. The fabric portion 3 according to the present embodiment is formed by a mesh fabric, more specifically, by a plain knitted lining, but is not limited thereto. Knitting of the lining that forms the fabric portion 3 may be not only plain-knitting but also a different knitting style (for example, rib knitting, purl knitting, Denbigh knitting, cord knitting, atlas knitting, or the like). Also, the lining is not limited to a knitted fabric but may be a woven fabric.

The lining forming the fabric portion 3 includes surfaces, the degrees of unevenness of which are different from each other. The degree of unevenness indicates at least one of a clearance between protrusions or recesses and a depth of each protrusion or each recess. In the present embodiment, the degree of unevenness indicates both the clearance between the protruded portions or the recessed portions and the depth of each protruded portion or each recessed portion. In other words, one surface (upper surface) of the lining is a ribbed surface with unevenness while the other surface (back surface) of the lining is a relatively flat surface (namely, a surface with less unevenness).

Figure 2A:
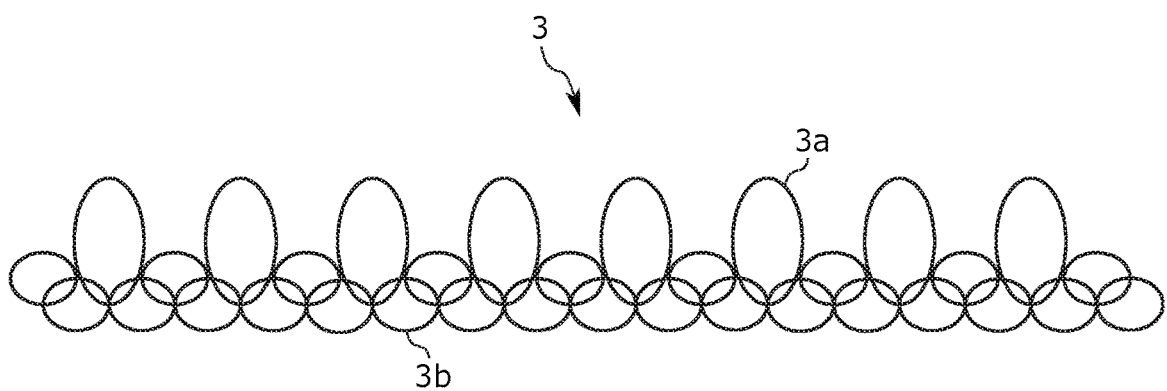
FIG. 2A is a schematic diagram showing a cross-section structure of a lining according to the embodiment of the present disclosure.
Figure 2B:
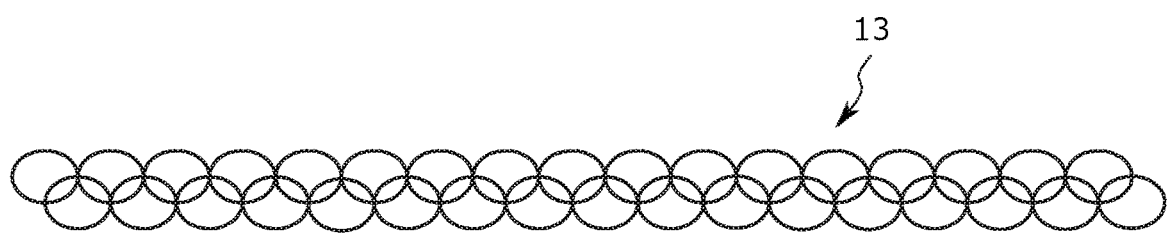
FIG. 2B is a schematic diagram showing a cross-section structure of a lining according to a comparative example.
Figure 2C:
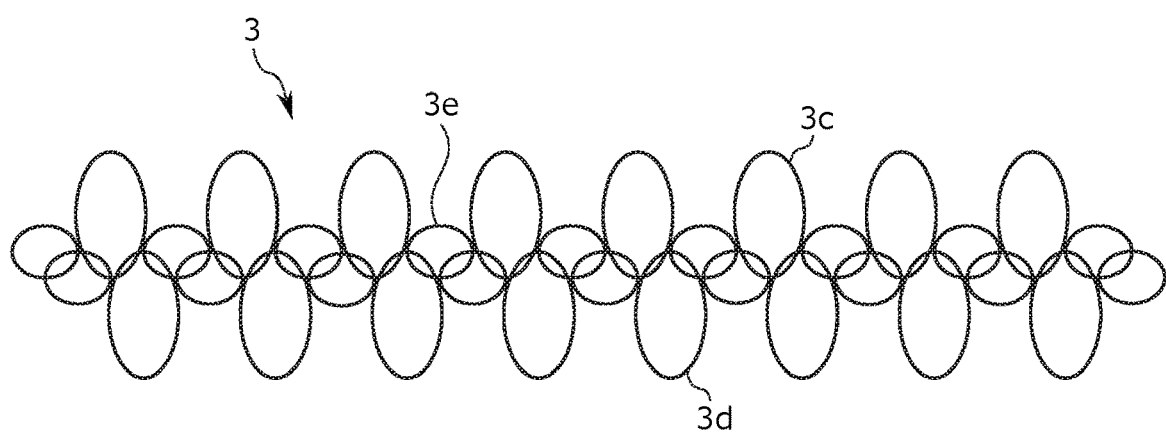
FIG. 2C is a schematic diagram showing a cross-section structure of a lining according to a modified example.

More specifically, the lining includes a plurality of laminated layers. Specifically, as shown in FIG. 2A, the lining is formed in a two-layer structure. FIG. 2A is a schematic diagram showing a cross-section structure of the lining according to the present embodiment. FIG. 2B shows a cross-section structure of a lining according to a comparative example. FIG. 2C shows a cross-section structure of a lining according to a modified example.

Figure 3A:
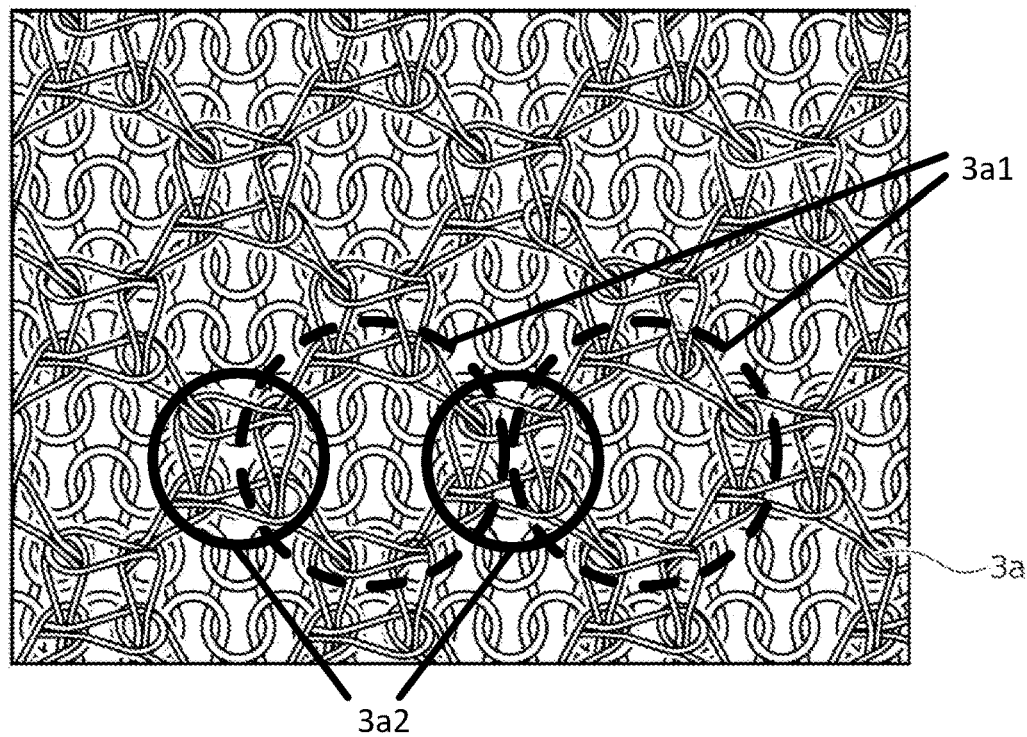
FIG. 3A is a diagram showing a textile structure of an upper surface of the lining according to the embodiment of the present disclosure.
Figure 3B:
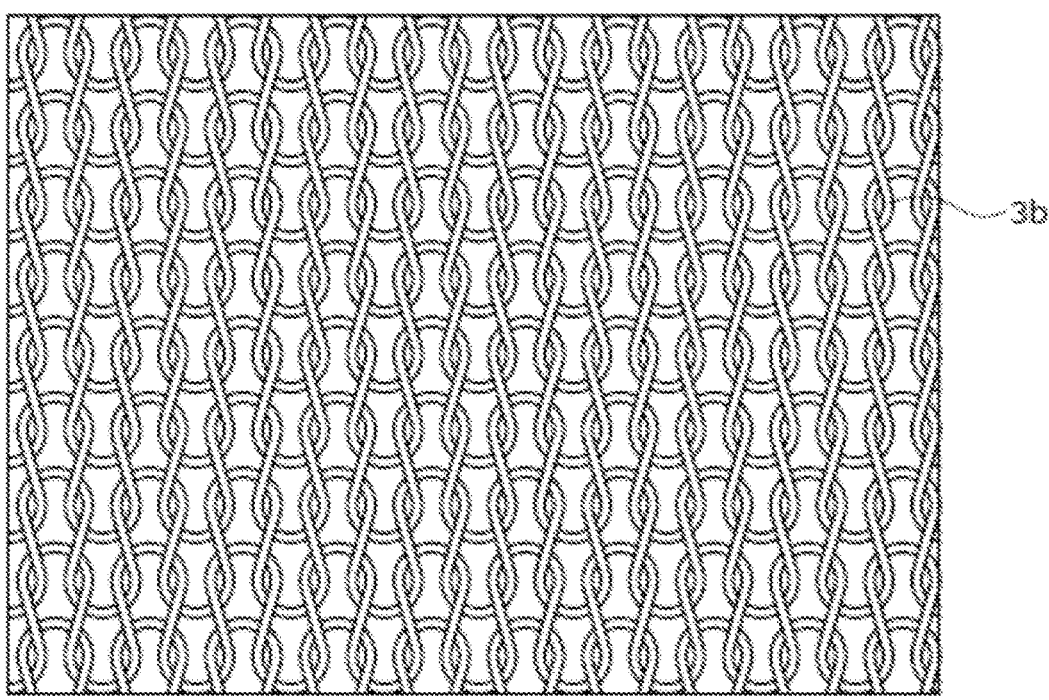
FIG. 3B is a diagram showing a textile structure of a back surface of the lining according to the embodiment of the present disclosure.

The two layers formed in the fabric portion 3 are knitted in a different manner to have different mesh sizes from each other (if the lining is a woven fabric, the two layers are woven in a different manner to have different mesh sizes from each other). More specifically, an upper-side layer 3a is one of the two layers, which has the larger mesh size, and the upper-side layer 3a is formed in a honeycomb pattern in the present embodiment as shown in FIG. 3A. A back-side layer 3b is the other of the two layers, which has the smaller mesh size, and the back-side layer 3b is formed in a plain pattern in the present embodiment as shown in FIG. 3B. FIG. 3A shows a textile structure of the upper surface of the lining according to the present embodiment. FIG. 3B shows a textile structure of the back surface of the lining according to the present embodiment.

Figure 4:
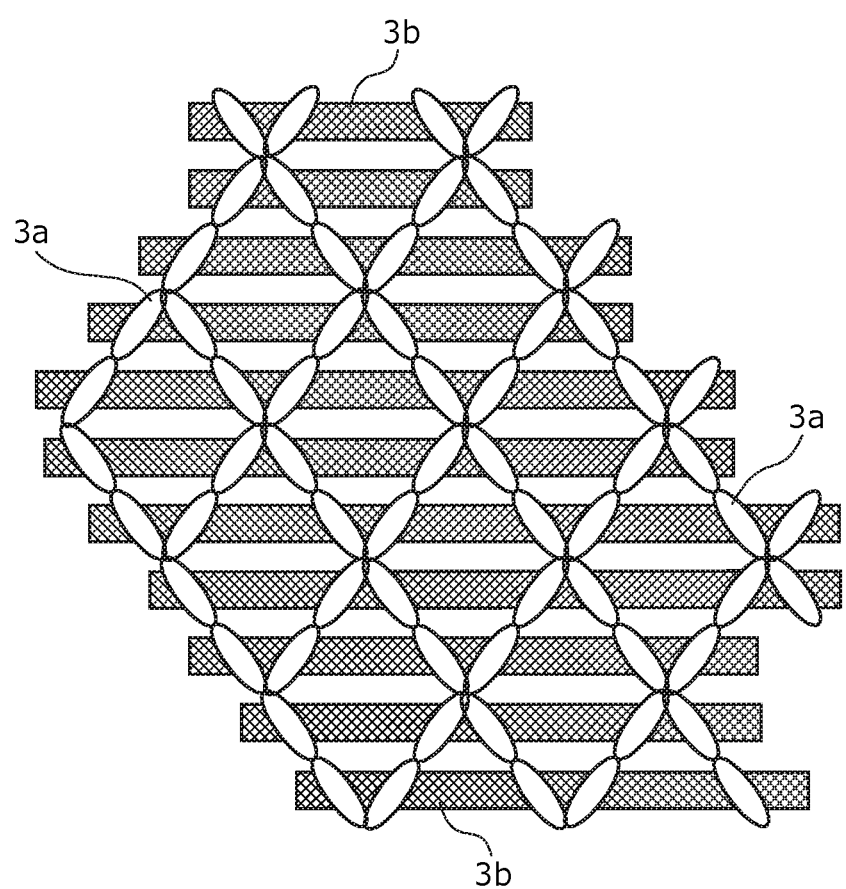
FIG. 4 is a diagram showing a knitting style of the lining according to the embodiment of the present disclosure.

The upper-side layer 3a is formed of drop stitches in the plain knitted lining. More specifically, in the course of knitting the lining, as shown in FIG. 4, for the amount of knitting in one repeat, drop-stitch knitting is performed so that one pattern (a lozenge grid pattern) is formed by upper yarn while eight loops are formed by under yarn. Drop-stitch knitting is performed in this manner; thereby, the layer having the larger mesh size, namely, the upper-side layer 3a is easily formed in the lining. FIG. 4 is a view showing a knitting style of the lining according to the present embodiment.

Also, as described above, in the present embodiment, the lining is configured so that the degree of unevenness of the upper surface is greater than the degree of unevenness of the back surface. The method to form the lining having such a configuration may include, for example, a method in which protruded portions configured by upper yarn (specifically, portions forming knitted stitches) are interlaced with one another into a three-dimensional shape to be arranged in a honeycomb shape as shown in FIG. 3A, but is not limited thereto. Alternatively, a different knitting or weaving style may be applied as long as the lining is formed such that the degree of unevenness of the upper surface is different from the degree of unevenness of the back surface. In an embodiment, the protruded portions are formed by interlaced shapes, such as a first interlaced shape 3a1 (dashed-line circles) and a second interlaced shape 3a2 (solid-line circles) that are interlaced with one another as shown in FIG. 3A.

The back-side layer 3b is bonded via a surface thereof (which is hereinafter referred to as a bonding surface) located on the opposite side of the upper-side layer 3a, to a back surface of the leather portion 2. In other words, in the present embodiment, the fabric portion 3 is bonded to the back surface of the leather portion 2 with an adhesive applied to the bonding surface of the back-side layer 3b. Thus, the fabric portion 3 is bonded to the leather portion 2 via the back-side layer 3b more densely structured. Consequently, the fabric portion 3 is further firmly bonded compared with a case of bonding via the upper-side layer 3a. In addition, the fabric portion 3 is formed in a mesh shape; therefore, locations to which adhesive is to be applied (that is, locations in which under yarn appears on the bonding surface) are dotted on the bonding surface. In other words, the leather portion 2 and the fabric portion 3 are bonded to each other by point contact. As just described, if the leather portion 2 and the fabric portion 3 are bonded to each other by point contact, compared with a case of bonding therebetween by surface contact, more favorable touch (for example, a tactile sense an occupant has when seated on the vehicle seat to which the cover material is attached and touching the cover material) is provided.

As described above, the fabric portion 3 according to the present embodiment is configured by the mesh lining formed in the two-layer structure. The cover material 1 configured in such a way that fabric portion 3 is bonded to the leather portion 2 has the thickness substantially the same as that of the natural leather before it is split, and in the meantime, the cover material 1 is lighter in weight than the natural leather. In other words, the cover material 1 is configured to be lighter in weight than the natural leather while keeping the texture of the natural leather before it is split.

In particular, the fabric portion 3 according to the present embodiment is configured such that the degree of unevenness of the upper surface is different from the degree of unevenness of the back surface, therefore being higher in volume compared with a fabric configured such that upper and back surfaces are uniform in the degree of unevenness. The lining configured as just described is bonded; thereby, the cover material 1 is configured to have favorable volume. In addition, the fabric portion 3 is configured such that the plurality of layers formed to have the mesh sizes different from each other are arranged in the laminated state. Therefore, according to the present embodiment, the texture or strength of natural leather can be effectively maintained and the weight can be reduced.

Specifically, for example, a fabric portion 13 shown in FIG. 2B, that is, the fabric portion 13 formed only of a single layer (specifically, a layer corresponding to the back-side layer 3b of the fabric portion 3 according to the present embodiment) is bonded to the leather portion 2. A cover material configured in such a manner may lack the texture (volume) of natural leather. Also, if the fabric portions 13 are overlapped in order to enhance the volume, the weight increases and therefore a lightweight effect due to the fabric portion 13 is not sufficiently obtained. On the other hand, the fabric portion 3 according to the present embodiment is formed of the two layers arranged in the thickness direction. Here, one of the two layers, (namely, the upper-side layer 3a) having the larger mesh size is lighter than the other of the two layers, (namely, the back-side layer 3b) having the smaller mesh size. Therefore, the weight of the cover material 1 including the layer having the larger mesh size in the fabric portion 3 is further reduced compared with a cover material uniformly having the smaller mesh size. As compared with the upper-side layer 3a, the back-side layer 3b is densely structured and has the high strength (rigidity). Therefore, the cover material 1 including the layer having the smaller mesh size in the fabric portion 3 has the strength higher than that of a cover material uniformly having the larger mesh size. As described above, according to the cover material 1, the weight reduction can be achieved and the texture of natural leather and the strength of the cover material can be secured.

Also, the physical property (volume and strength) of natural leather, which is reduced due to split processing, is compensated for by the fabric portion 3; thereby, the strength required for the cover material 1 to be applied as a cover material for a vehicle seat can be secured. Furthermore, the fabric portion 3 is bonded to the leather portion 2; thereby, an influence due to a difference between extraction sites of the natural leather forming the leather portion 2 can be minimized. Specifically, the physical property of natural leather may vary depending on the extraction sites. However, the natural leather is processed to be thinner, and then the fabric portion 3 is bonded to the natural leather; thereby, the influence due to the difference between the extraction sites is minimized and the physical property of the cover material 1 can be uniformed.

Further, to appropriately secure the strength of the cover material 1, it is desirable that the weight per unit area (the so-called basis weight) of the fabric portion 3 is equal to or greater than 100 g/m$^2$, more preferably, from 100 g/m$^2$ to 250 g/m$^2$.

Furthermore, in the present embodiment, the elasticity of the fabric portion 3 is higher than the elasticity of the leather portion 2. Accordingly, the cover material 1 is higher in elasticity, and when an occupant is seated on the vehicle seat and portions of the seat are therefore deformed, the cover material 1 is appropriately deformed according to the deformation of the portions of the seat.

In addition, the fabric portion 3 in the two-layer structure is explained as an example in the foregoing embodiment; however, the number of layers of the fabric portion 3 may be two or more. The fabric portion 3 may be formed in a three-layer structure as shown in FIG. 2C. The fabric portion 3 shown in FIG. 2C includes an upper-side layer 3c and a back-side layer 3d that have the same mesh size, and an intermediate layer 3e interposed between the upper-side layer 3c and the back-side layer 3d. Also, in the foregoing embodiment, the fabric portion 3 is configured such that the surface of the layer having the smaller mesh size (specifically, the bonding surface of the back-side layer 3b) is bonded to the back surface of the leather portion 2, but is not limited thereto. Alternatively, the fabric portion 3 as shown in FIG. 2C may be configured such that the layer having the larger mesh size is bonded to the leather portion 2. More specifically, the upper-side layer 3c and the back-side layer 3d of the fabric portion 3 shown in FIG. 2C are each a layer having the larger mesh size, and they are formed of drop stitches. The intermediate layer 3e is a layer having the smaller mesh size. The fabric portion 3 shown in FIG. 2C is bonded via a surface of the back-side layer 3d to the back surface of the leather portion 2. A cover material obtained in this case is lightweight and can secure the texture and strength of natural leather in a similar way to the cover material according to the foregoing embodiment (namely, the cover material 1). Note that the cover material according to the foregoing embodiment is more favorable in firmly bonding the leather portion 2 and the fabric portion 3 together.

Next, a practical example of the cover material 1 is described. Natural leather (for example, bull leather) with a thickness of about 1.2 mm is split to have a thickness of 0.6 mm; thereby, the leather portion 2 of components of the cover material 1 can be obtained. In addition, surface treatment for enhancing wear resistance may be applied to the surface of the grain layer 2a of the leather portion 2 to form the surface treated layer 2c.

The fabric portion 3 can be obtained by plain-knitting a mesh fabric (lining) by using a double knitting machine. Here, the original yarn of the fabric portion 3 is a finished yarn of polyester fiber having a fiber diameter of 110 decitex per 36 filaments (namely, a fiber thickness of 100 Denier) and the brightness of Semi Dull (SD). Further, in plain-knitting the fabric, the fabric is knitted to form a two-layer structure, and in addition, the fabric is knitted such that one of the layers is formed of drop stitches. Furthermore, a fabric thickness of 0.5 mm and a fabric basis weight of 100 g/m$^2$ are set as fabric knitting conditions, and the fabric knitted according to the fabric knitting conditions is obtained. As described above, the basis weight may be in a range from 100 g/m² to 250 g/m².

An adhesive is applied to the surface (bonding surface) of the back-side layer 3*b* having the smaller mesh size in the fabric portion 3 obtained according to the aforementioned procedure, and the bonding surface is bonded to the back surface of the leather portion 2. At the time the aforementioned process is finished, the cover material 1 is completed.

The configuration of the cover material 1 described above is merely an example, and the cover material 1 may be configured in a different manner. For example, the foregoing fabric portion 3 is formed of a knitted or woven fabric, but is not limited thereto. The fabric portion 3 may be formed by any manufacturing process or may be formed of any material as long as the fabric portion 3 configures a mesh fabric portion. A fabric formed of a different material or formed by a different manufacturing process (for example, a fabric of resin fiber formed and arranged in a mesh shape) other than a knitted or knitted fabric may be applied as the fabric portion 3.

TABLE OF REFERENCE NUMERALS

1 cover material (cover material for vehicle seat)
2 leather portion
2*a* grain layer
2*b* split layer
2*c* surface treated layer
3, 13 fabric portion
3*a*, 3*c* upper-side layer
3*a*1 first interlaced shape
3*a*2 second interlaced shape
3*b*, 3*d* back-side layer
3*e* intermediate layer

The invention claimed is:

1. A cover material for a vehicle seat, comprising:
   a leather portion made of natural leather or artificial leather; and
   a mesh fabric portion located on a back side of the leather portion, wherein:
   the mesh fabric portion includes an upper-side layer and a back-side layer, the upper-side layer and the back-side layer being formed by being knitted in a different manner from each other, and a surface of the upper-side layer having a greater degree of unevenness than a surface of the back-side layer,
   the surface of the upper-side layer includes first interlaced shape portions and second interlaced shape portions that are alternately arranged with one another, and
   the first interlaced shape portions have a first mesh size and the second interlaced shape portions have a second mesh size that is smaller than the first mesh size.

2. The cover material for the vehicle seat according to claim 1, wherein the mesh fabric portion is bonded to a back surface of the leather portion by point contact via the surface of the back-side layer.

3. The cover material for the vehicle seat according to claim 1, wherein the mesh fabric portion is bonded to the back surface of the leather portion with an adhesive applied to the surface of the back-side layer.

4. The cover material for the vehicle seat according to claim 1, wherein an elasticity of the mesh fabric portion is higher than an elasticity of the leather portion.

5. The cover material for the vehicle seat according to claim 1, wherein a weight per unit area of the mesh fabric portion is equal to or larger than 100 g/m².

6. The cover material for the vehicle seat according to claim 1, wherein the leather portion is made of natural leather or artificial leather processed to have a thickness smaller than that before the leather is processed.

7. The cover material for the vehicle seat according to claim 6, wherein the leather portion is made of natural leather split to have a thickness equal to or smaller than half of that before the leather is split.

8. The cover material for the vehicle seat according to claim 1, wherein the first interlaced shape portions and the second interlaced shape portions are formed by interlacing protruded portions configured by upper yarn with one another into a three-dimensional shape.

9. The cover material for the vehicle seat according to claim 8, wherein the three-dimensional shape is a honeycomb shape.

* * * * *